United States Patent
Hong

(10) Patent No.: US 12,484,015 B2
(45) Date of Patent: Nov. 25, 2025

(54) METHOD AND APPARATUS FOR SENDING PAGING MESSAGE, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 406 days.

(21) Appl. No.: 17/923,887

(22) PCT Filed: May 8, 2020

(86) PCT No.: PCT/CN2020/089261
§ 371 (c)(1),
(2) Date: Nov. 7, 2022

(87) PCT Pub. No.: WO2021/223239
PCT Pub. Date: Nov. 11, 2021

(65) Prior Publication Data
US 2023/0209499 A1    Jun. 29, 2023

(51) Int. Cl.
*H04W 68/00* (2009.01)
*H04W 36/08* (2009.01)

(52) U.S. Cl.
CPC ........... *H04W 68/00* (2013.01); *H04W 36/08* (2013.01)

(58) Field of Classification Search
CPC ..... H04W 68/00; H04W 36/08; H04W 68/12; H04W 76/27; H04W 88/06; H04W 36/02
See application file for complete search history.

(56) References Cited

U.S. PATENT DOCUMENTS

| 2014/0256319 | A1 | 9/2014 | Lee |
| 2015/0080034 | A1 | 3/2015 | Xi et al. |
| 2019/0327786 | A1* | 10/2019 | Hong ............... H04W 76/27 |

FOREIGN PATENT DOCUMENTS

| CN | 102291820 A | | 12/2011 | |
| CN | 102835162 A | | 12/2012 | |
| CN | 110139362 A | | 8/2019 | |
| CN | 110313201 A | * | 10/2019 | ........ H04W 28/0808 |
| WO | 2020032849 A1 | | 2/2020 | |

OTHER PUBLICATIONS

International Search Report of PCT/CN2020/089261 dated Jan. 6, 2021, (4p).
Office Action issued to Indian Application No. 202247069121 dated Jan. 17, 2023 with partial English translation, (5p).
The extended European search report of application No. 20934535.4 dated on Dec. 20, 2023 .(9P).

* cited by examiner

*Primary Examiner* — Marcos L Torres
(74) *Attorney, Agent, or Firm* — Arch & Lake LLP; Hao Tan; Shen Wang

(57) ABSTRACT

A method for sending a paging message is performed by a first base station connected to a first SIM in a terminal, which sends to a target base station a paging message for paging a second SIM in a radio resource control (RRC) inactive state within a terminal. The target base station is a second base station adjacent to the first base station, or the target base station includes a second base station and a base station adjacent to the second base station.

18 Claims, 10 Drawing Sheets

METHOD AND APPARATUS FOR SENDING PAGING MESSAGE, COMMUNICATION DEVICE, AND STORAGE MEDIUM

CROSS-REFERENCE TO RELATED APPLICATION

This application is the U.S. national phase application of International Application No. PCT/CN2020/089261, filed on May 8, 2020, the entire content of which is incorporated herein by reference for all purposes.

TECHNICAL FIELD

The disclosure relates to the field of wireless communication technologies, but is not limited to the field of wireless communication technologies, and in particular, to a method and an apparatus for sending a paging message, a communication device and a storage medium.

BACKGROUND

A new radio resource control (RRC) state, that is, an RRC inactive state, is introduced into the new radio (NR) of the fifth generation mobile communication (5G). When a terminal is in the RRC inactive state, the non-access (NAS) layer of the terminal remains in an RRC connected state. At this time, the connection between the terminal and a core network remains, and the air interface connection between the terminal and the base station is disconnected. The base station retains context information of the terminal and the connection between the terminal and the core network. The terminal can move within an area configured by the base station without notifying the network, to save signaling overhead.

When the terminal enters the RRC inactive state, the last serving base station stores the context of the terminal and its connection to the core network. The access (AS) layer of the terminal also stores the corresponding context information, including the bearer, the identification of the RRC inactive state, and the home area.

In this way, the base station can page to the terminal in the RRC inactive state through the radio access network paging mechanism within the configured area. The terminal can quickly resume data transmission based on the context information stored on the terminal side and the base station side, thereby realizing low delay transmission.

With the development of wireless communication technology, there are more and more multi-SIM (subscriber identity module) mobile phones in the market.

At present, the processing methods for the multi-SIM mobile phones are mainly implemented by various terminal manufacturers, and there is no unified standard, which leads to many different terminal behaviors and processing methods, for example, dual SIM single standby, dual SIM dual standby single pass, dual SIM dual standby dual pass, etc. For the multi-SIM terminal, the network considers different SIMs as different terminals. Each SIM communicates with the network separately. When performing wireless communication with the network, the terminals are not associated with each other, for example, the terminal cannot share or synchronize some information. In the process of wireless communication, this may cause unnecessary operations between the base station and the multi-SIM terminal, resulting in power consumption and signaling waste.

SUMMARY

The present disclosure provides a method for sending a paging message, applied to a first base station connected with a first subscriber identity module (SIM) in a terminal, the method including:
  sending, a paging message for paging a second SIM in a radio resource control (RRC) inactive state in the terminal, to a target base station, wherein the target base station is a second base station adjacent to the first base station; or, the target base station includes the second base station and an adjacent base station of the second base station.

According to a second aspect of the present disclosure, a first base station is provided. The first base station is connected with a first SIM in a terminal, and includes:
  a processor; and
  a memory, configured to store instructions executable by the processor,
  wherein the processor is configured to implement the method described in any embodiment of the present disclosure when running the executable instructions.

According to a third aspect of the present disclosure, a computer storage medium is provided. The computer storage medium is stored thereon with computer executable instructions, which implements the method described in any embodiment of the present disclosure when being executed by a processor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in embodiments of the present disclosure are only for the purpose of describing particular embodiments, and are not intended to limit the embodiments of the present disclosure. As used in the embodiments of the present disclosure and the appended claims, the singular forms "a," "the," and "said" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the present disclosure to describe various pieces of information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the word "if" as used herein can be interpreted as "in case of" or "when" or "in response to determining."

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
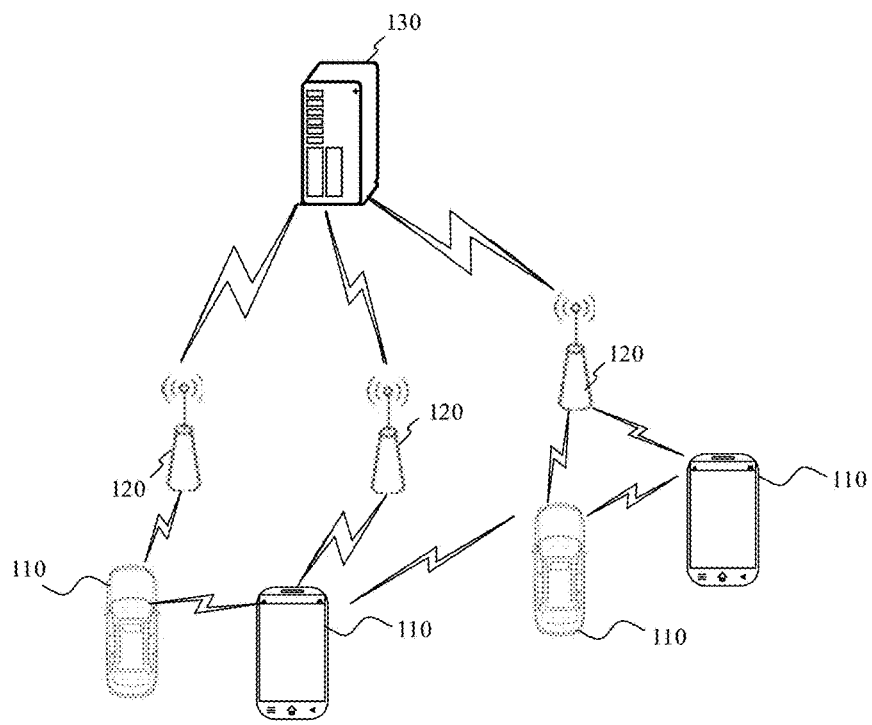
FIG. 1 shows a schematic diagram of a wireless communication system.

Please refer to FIG. 1, which shows a schematic diagram of a wireless communication system provided by an embodiment of the present disclosure. As shown in FIG. 1, the wireless communication system is a communication system based on cellular mobile communication technology, and the wireless communication system may include: several user equipment 110 and several base stations 120.

The user equipment 110 may be a device that provides voice and/or data connectivity to the user. The user equipment 110 may communicate with one or more core networks via a Radio Access Network (RAN), and the user equipment 110 may be an IoT terminal such as a sensor device, a mobile phone (or "cellular" phone) and a computer of the IoT terminal, for example, may be a fixed, portable, pocket, hand-held, computer built-in or a vehicle-mounted device, for example, Station (STA), subscriber unit, subscriber station, mobile station, mobile, remote station, access point, remote terminal, access terminal, user terminal, user agent, user device, or user equipment (UE). Alternatively, the user equipment 110 may also be a device of an unmanned aerial vehicle. Alternatively, the user equipment 110 may also be a vehicle-mounted device, for example, a trip computer with a wireless communication function, or a wireless communication device externally connected to the trip computer. Alternatively, the user equipment 110 may also be a roadside device, for example, a street light, a signal light, or other roadside devices with a wireless communication function.

The base station 120 may be a network-side device in the wireless communication system. The wireless communication system may be the 4th generation mobile communication (4G) system, also known as Long Term Evolution (LTE) system; or, the wireless communication system may also be a 5G system, also known as new radio (NR) system or 5G NR system. Alternatively, the wireless communication system may also be a next-generation system of the 5G system. The access network in the 5G system may be called NG-RAN (New Generation-Radio Access Network).

The base station 120 may be an evolved base station (eNB) used in the 4G system. Alternatively, the base station 120 may also be a base station (gNB) that adopts a centralized-distributed architecture in the 5G system. When the base station 120 adopts the centralized-distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; a physical (PHY) layer protocol stack is provided in the distributed unit, and the specific implementation of the base station 120 is not limited in embodiments of the present disclosure.

A wireless connection can be established between the base station 120 and the user equipment 110 through a radio air interface. In different embodiments, the radio air interface is a radio air interface based on the fourth generation mobile communication network technology (4G) standard; or, the radio air interface is a radio air interface based on the fifth generation mobile communication network technology (5G) standard, such as a new air interface; or, the radio air interface may also be a radio air interface based on a next-generation mobile communication network technology standard of 5G.

In some embodiments, an E2E (End to End) connection may also be established between the terminals 11, for example, in scenarios such as V2V (vehicle to vehicle) communication, V2I (vehicle to Infrastructure) communication and V2P (vehicle to pedestrian) communication in V2X (vehicle to everything) communication.

Here, the user equipment may be considered as the terminal device in the following embodiments.

In some embodiments, the above wireless communication system may further include a network management device 130.

Several base stations 12 are respectively connected to the network management device 130. The network management device 130 may be a core network device in the wireless communication system. For example, the network management device 13 may be a mobility management entity (MME) in an evolved packet core (EPC) network. Alternatively, the network management device may also be other core network devices, such as a serving gateway (SGW), a public data network gateway (PGW), a policy and charging rules function (PCRF) or home subscriber server (HSS), etc. The implementation form of the network management device 130 is not limited in embodiments of the present disclosure.

In order to facilitate the understanding of any embodiment of the present disclosure, a paging scenario in a network is first described through an embodiment.

The fifth generation mobile communication (5G) wireless mobile communication system has introduced a third state—

RRC inactive state, in addition to the two states of idle state and connected state in LTE (Long Term Evolution). For the terminal in the RRC inactive state, downlink data or signaling from the core network may trigger the radio access network (RAN) to paging the terminal.

Figure 2:
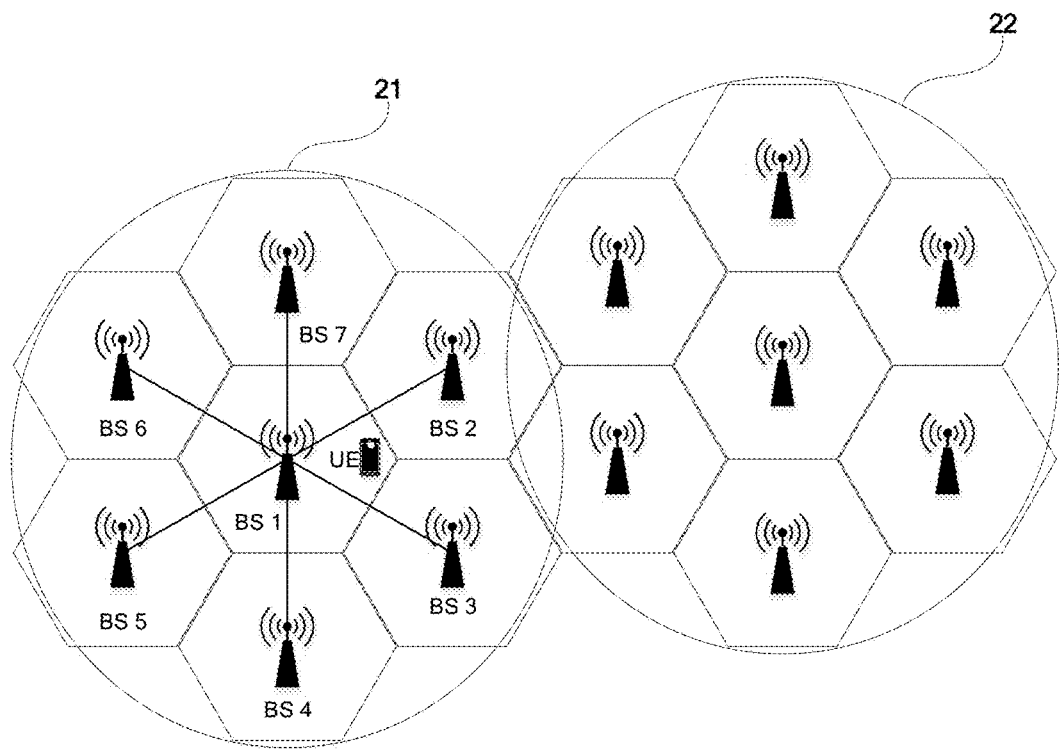
FIG. 2 is a flowchart of a paging scenario in a network according to an example of the present disclosure.

The anchor base station configures a wireless access notification area (RNA) for the terminal. After the anchor base station calculates the paging priority based on downlink data or downlink signaling, it will notify the base station in the RNA of the paging priority, so that the base station in the RNA can page the terminal according to the received paging priority. Referring to FIG. 2, the RNAs shown in FIG. 2 includes a first RNA 21 and a second RNA 22. In the first RNA 21, the base station 1 is an anchor base station, and the base stations in the first RNA 21 configured by the base station 1 for the terminal include the base stations 2, 3, 4, 5, 6, and 7 connected to the base station 1 through the X2 interface. After calculating the paging priority based on downlink data or downlink signaling, the base station Twill notify the base stations 2, 3, 4, 5, 6, and 7 in the RNA of the paging priority.

Figure 3A:
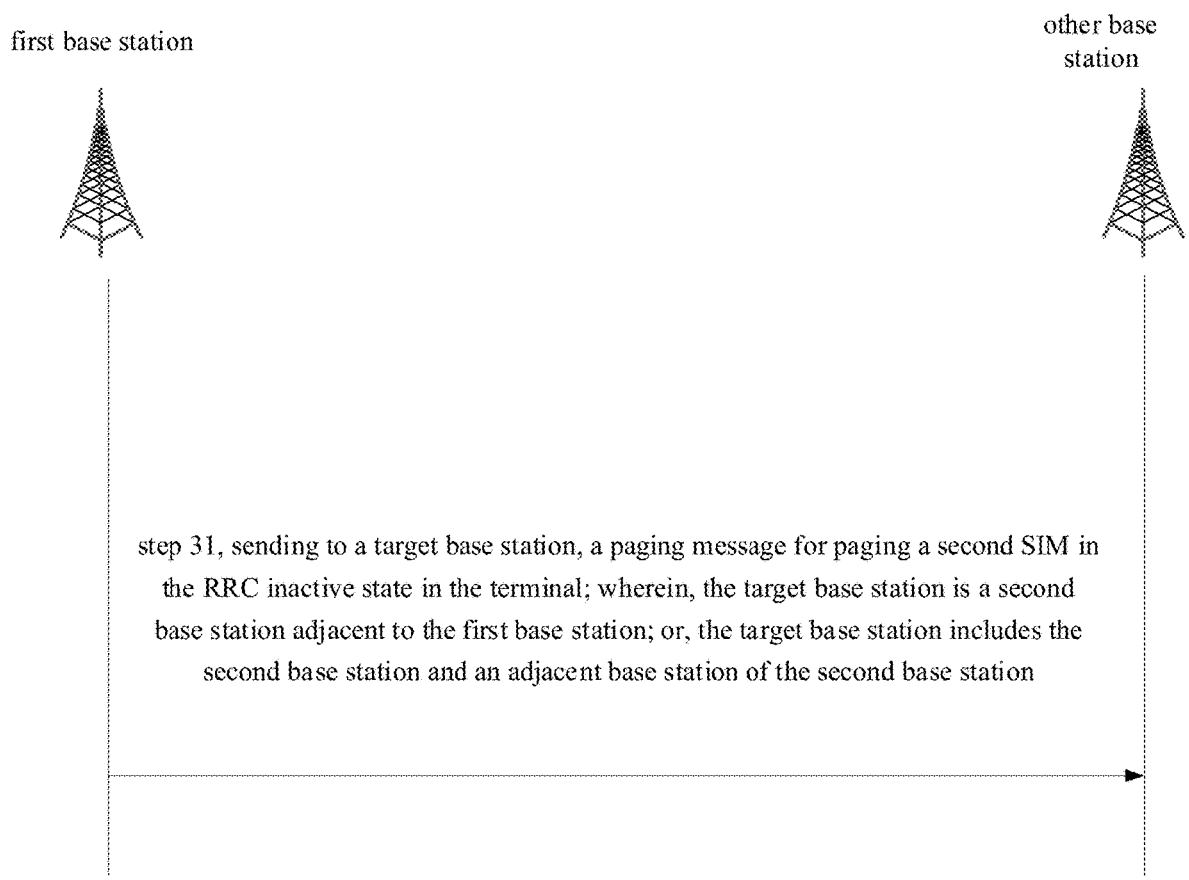
FIG. 3a is a flowchart of a method for sending a paging message according to an example of the present disclosure.

As shown in FIG. 3a, this embodiment provides a method for sending a paging message, which is applied to a first base station connected with a first subscriber identity module (SIM) in the terminal. The method includes:

step 31, sending to a target base station, a paging message for paging a second SIM in the RRC inactive state in the terminal; wherein, the target base station is a second base station adjacent to the first base station; or, the target base station includes the second base station and an adjacent base station of the second base station.

In one embodiment, the terminal is a terminal including a plurality of SIMs. The multi-SIM terminal may be a terminal with at least two SIMs, for example, a dual-SIM terminal. Here, a behavior mode of the multi-SIM terminal may be dual SIM dual standby dual pass.

In one embodiment, the SIM exists in the form of a single individual.

In another embodiment, the SIM is an e-SIM (embedded Subscriber Identification Module) that exist in the terminal in an integrated form.

In one embodiment, the dual-SIM terminal is a terminal including a first SIM and a second SIM.

Here, the terminal may be, but is not limited to, a mobile phone, a wearable device, a vehicle terminal, a road side unit (RSU), a smart home terminal, an industrial sensing device and/or a medical device.

In one embodiment, please refer to FIG. 2 again, if the base station 1 is the first base station, the second base station adjacent to the first base station may be base station 2, base station 3, base station 4, base station 5, base station 6, or base station 7. The adjacent base station of the second base station may be base station 3 or base station 7. Here, the base stations are connected through the inter base station interface. For example, the inter base station interface includes X2 interface in 4G system and Xn interface in 5G system.

In one embodiment, the first base station switches the first SIM of the terminal connected to the first base station from the RRC connected state to the RRC inactive state.

In one embodiment, the first base station will periodically query whether the first SIM is in the RRC connected state. In this way, the RRC state of the terminal can be acquired in real time.

In one embodiment, the first base station can determine that the terminal is located in the cell corresponding to the first base station only when the first SIM is in the RRC connected state.

In one embodiment, when the second SIM has downlink data, the access and mobility management function (AMF) of the core network will send data and other information to the anchor base station of the first SIM. Here, the anchor base station of the first SIM is the first base station.

In one embodiment, please refer to FIG. 2 again, after receiving the data sent by the AMF, the first base station (base station 1) will send a radio access network paging message to base station 2, instead of sending a paging message to all base stations in the RNA (six base stations in total of base station 1, . . . , base station 7 in FIG. 2).

In one embodiment, please refer to FIG. 2 again, after receiving the data sent by the AMF, the first base station (base station 1) will send a paging message to base station 2 and its adjacent base stations, instead of sending a paging message to all base stations in the entire RNA of the second SIM.

In one embodiment, the adjacent base stations of base station 2 and base station 2 will send a paging signaling after receiving the paging message sent by base station 1, to page the second SIM in the RRC inactive state.

In one embodiment, the second SIM in the RRC inactive state establishes an RRC connection with the currently resident base station after receiving the paging signaling.

Figure 4:
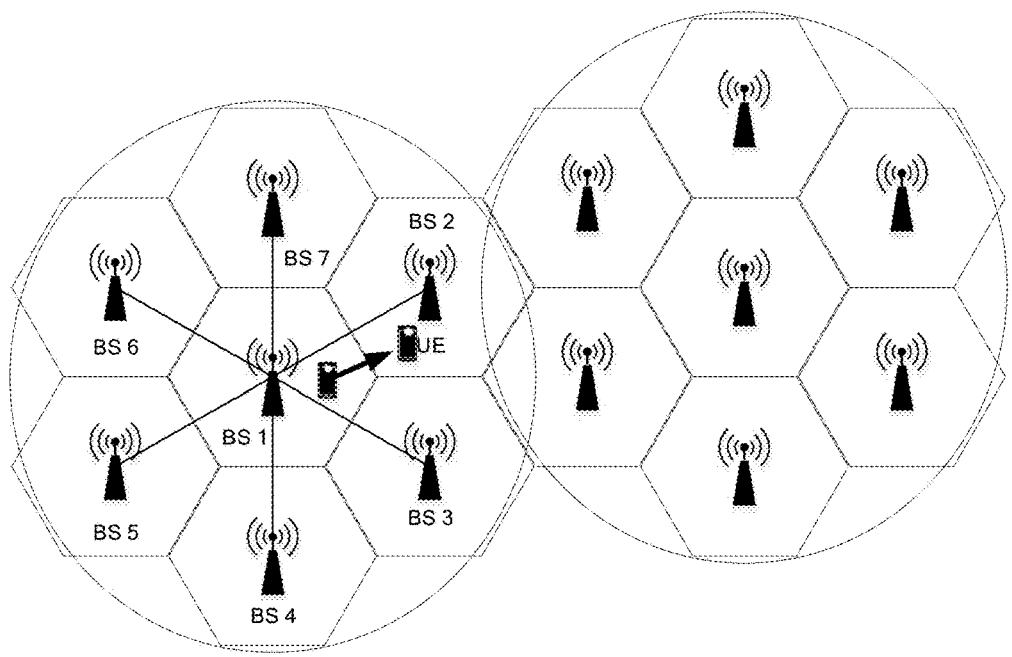
FIG. 4 is a flowchart of a method for sending a paging message according to an example of the present disclosure.

In one embodiment, referring to FIG. 4, after receiving the data sent by the AMF, base station 1 will send a radio access network paging message to base station 2. After receiving the paging message sent by base station 1, base station 2 will send a paging signaling to page the second SIM in the RRC inactive state. The second SIM in the RRC inactive state establishes an RRC connection with base station 2 after receiving the paging signaling.

Figure 5:
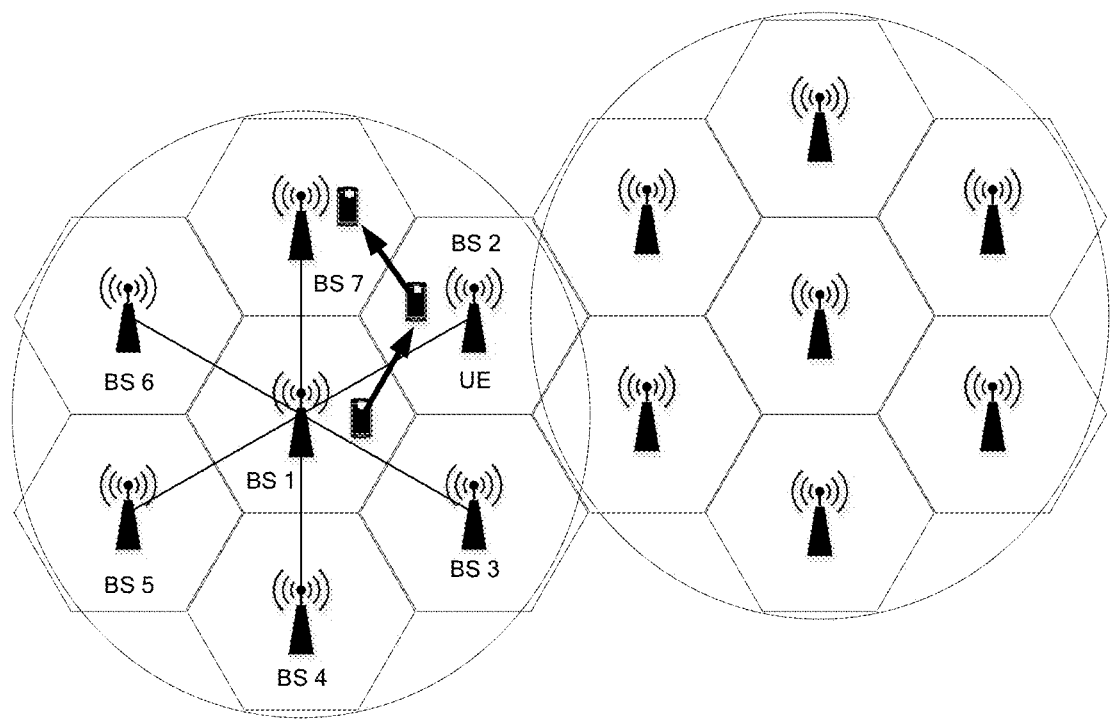
FIG. 5 is a flowchart of a method for sending a paging message according to an example of the present disclosure.

In one embodiment, please refer to FIG. 5, after receiving the data sent by the AMF, base station 1 will send a radio access network paging message to base station 2, base station 7, and base station 3. After receiving the paging message sent by base station 1, base station 7 will send a paging signaling to page the second SIM in the RRC inactive state. The second SIM in the RRC inactive state establishes an RRC connection with the base station 7 after receiving the paging signaling. After RRC connection is established, if data needs to be sent and received, the terminal can send and receive data with the network side through the second SIM.

In embodiments of the present disclosure, the first base station only needs to send a paging message to the target base station for paging the second SIM, and then it can page to the second SIM, without the need to page other base stations except the target base station, which reduces the paging range and the paging signaling cost.

Figure 3B:
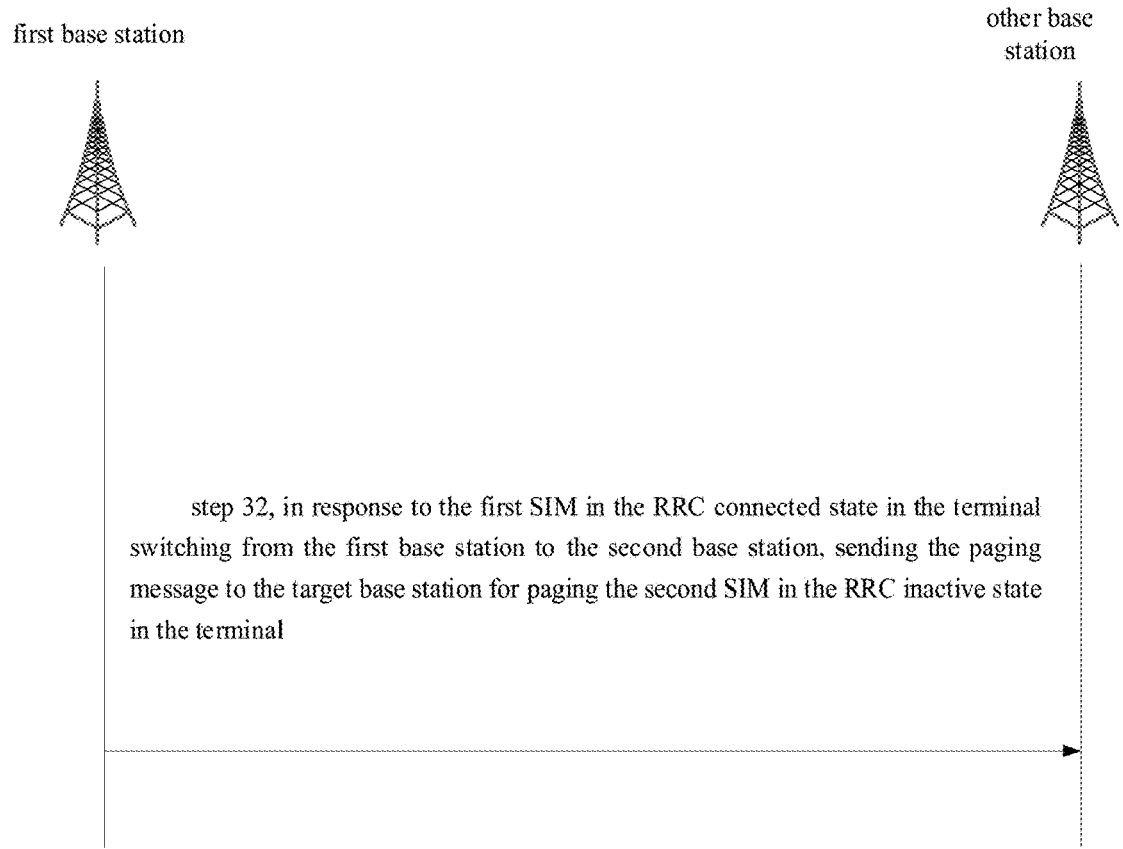
FIG. 3b is a flowchart of a method for sending a paging message according to an example of the present disclosure.

As shown in FIG. 3b, this embodiment provides a method for sending a paging message. In step 31, sending to the target base station, the paging message for paging the second SIM in the RRC inactive state in the terminal, includes:

step 32, in response to the first SIM in the RRC connected state in the terminal switching from the first base station to the second base station, sending the paging message to the target base station for paging the second SIM in the RRC inactive state in the terminal.

In one embodiment, in response to the first SIM in the RRC connected state switching to the second base station, sending to the target base station, the paging message for paging the second SIM in the RRC inactive state in the terminal, includes:

when the first SIM in the RRC connected state in the terminal switches from the first base station to the second base station, sending to the target base station, the paging message for paging the second SIM in the RRC inactive state in the terminal.

In one embodiment, the first SIM is determined to switch to the second base station in response to the change of the location of the terminal and the signal strength of the signal sent by the second base station received by the terminal being greater than the signal strength of the signal sent by the first base station.

In one embodiment, after the first SIM switches to the second base station, the first SIM accesses the wireless network through the second base station or the adjacent base station of the second base station.

In one embodiment, the first base station switches the first SIM of the terminal connected to the first base station from the RRC connected state to the (RRC) inactive state.

In one embodiment, the first base station will periodically query whether the first SIM is in the RRC connected state. In this way, the RRC state of the terminal can be acquired in real time.

In one embodiment, the first base station can determine that the terminal is located in the cell corresponding to the first base station only when the first SIM is in the RRC connected state.

In one embodiment, after the first SIM switches to the second base station, it can reside in the cell of the second base station, or it can leave the second base station and enter the cell of the adjacent base station adjacent to the second base station. For example, please refer to FIG. 2 again, after entering the cell of base station 2 from the cell of base station 1, the terminal can reside in the cell of base station 2, or leave the cell of base station 2 to enter the cell of base station 3 or base Station 7 adjacent to the cell of base station 2.

In one embodiment, please refer to FIG. 4 again, the location of the terminal changes, the first SIM in the RRC connected state of the terminal switches to the base station 2 adjacent to base station 1. After receiving the data sent by the AMF, base station 1 will send a radio access network paging message to base station 2. After receiving the paging message sent by base station 1, base station 2 will send a paging signaling to page the second SIM in the RRC inactive state. The second SIM in the RRC inactive state establishes an RRC connection with base station 2 after receiving the paging signaling.

In an embodiment, please refer to FIG. 5 again. The location of the terminal changes. The first SIM in the RRC connected state in the terminal switches to the base station 2 adjacent to base station 1, and then enters the cell of base station 7. After receiving the data sent by the AMF, base station 1 will send a radio access network paging message to base station 2, base station 7, and base station 3. After receiving the paging message sent by base station 1, base station 7 will send a paging signaling to page the second SIM in the RRC inactive state. The second SIM in the RRC inactive state establishes an RRC connection with the base station 7 after receiving the paging signaling. After RRC connection is established, if data needs to be sent and received, the terminal can send and receive data with the network side through the second SIM.

Figure 6:
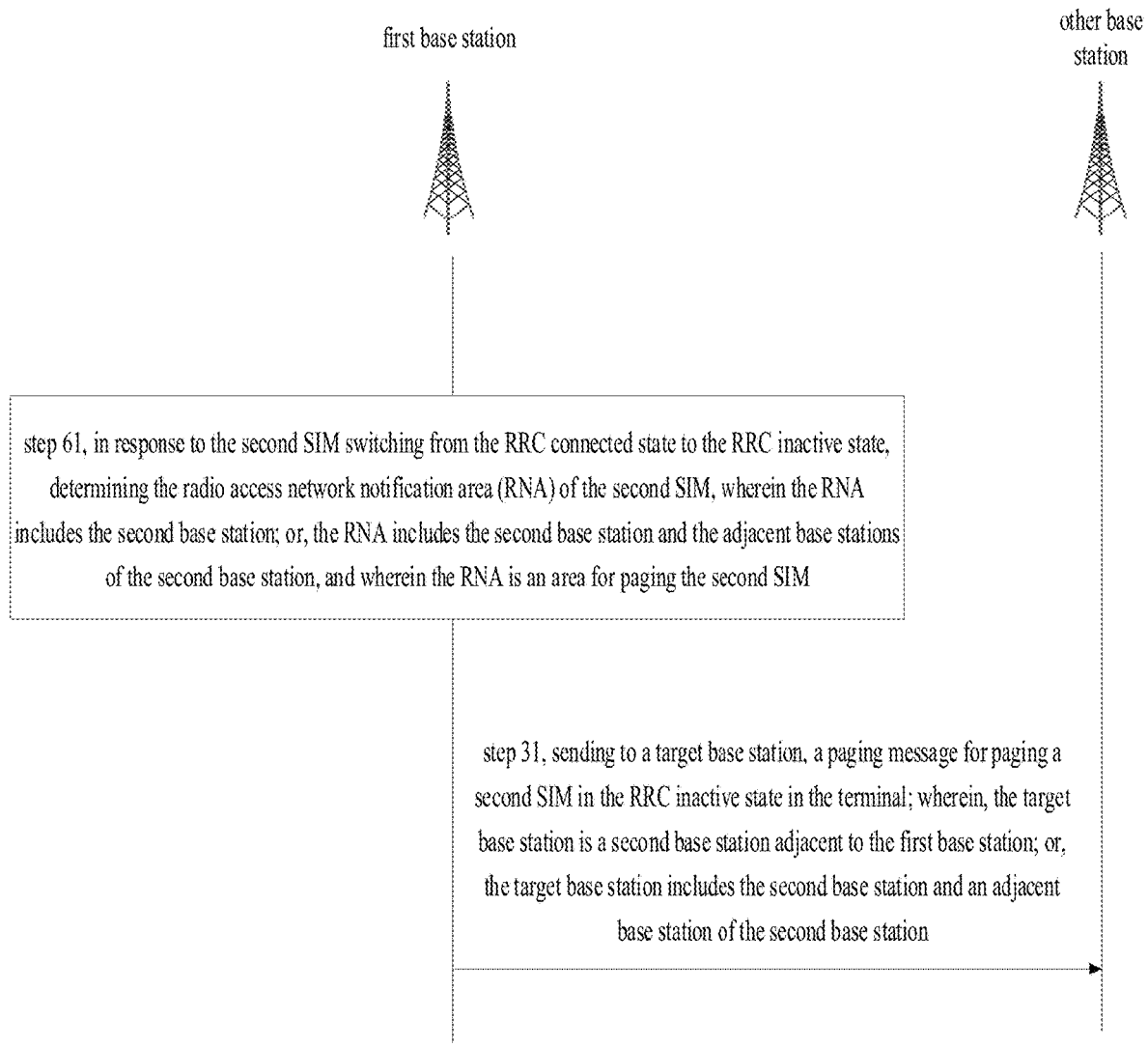
FIG. 6 is a flowchart of a method for sending a paging message according to an example of the present disclosure.

As shown in FIG. 6, this embodiment provides a method for sending a paging message, which further includes:
  step 61, in response to the second SIM switching from the RRC connected state to the RRC inactive state, determining the radio access network notification area (RNA) of the second SIM, wherein the RNA includes the second base station; or, the RNA includes the second base station and the adjacent base stations of the second base station, and wherein the RNA is an area for paging the second SIM.

In one embodiment, in response to the second SIM switching from the RRC connected state to the RRC inactive state, determining the base station directly connected with the first base station through the Xn interface as belonging to the same RNA.

In one embodiment, please refer to FIG. 2 again, base station 2, base station 3, base station 4, base station 5, base station 6, and base station 7 belong to the same RNA.

In one embodiment, base station 2 is the second base station, and base station 3 and base station 7 are adjacent base stations of base station 2.

Figure 7:
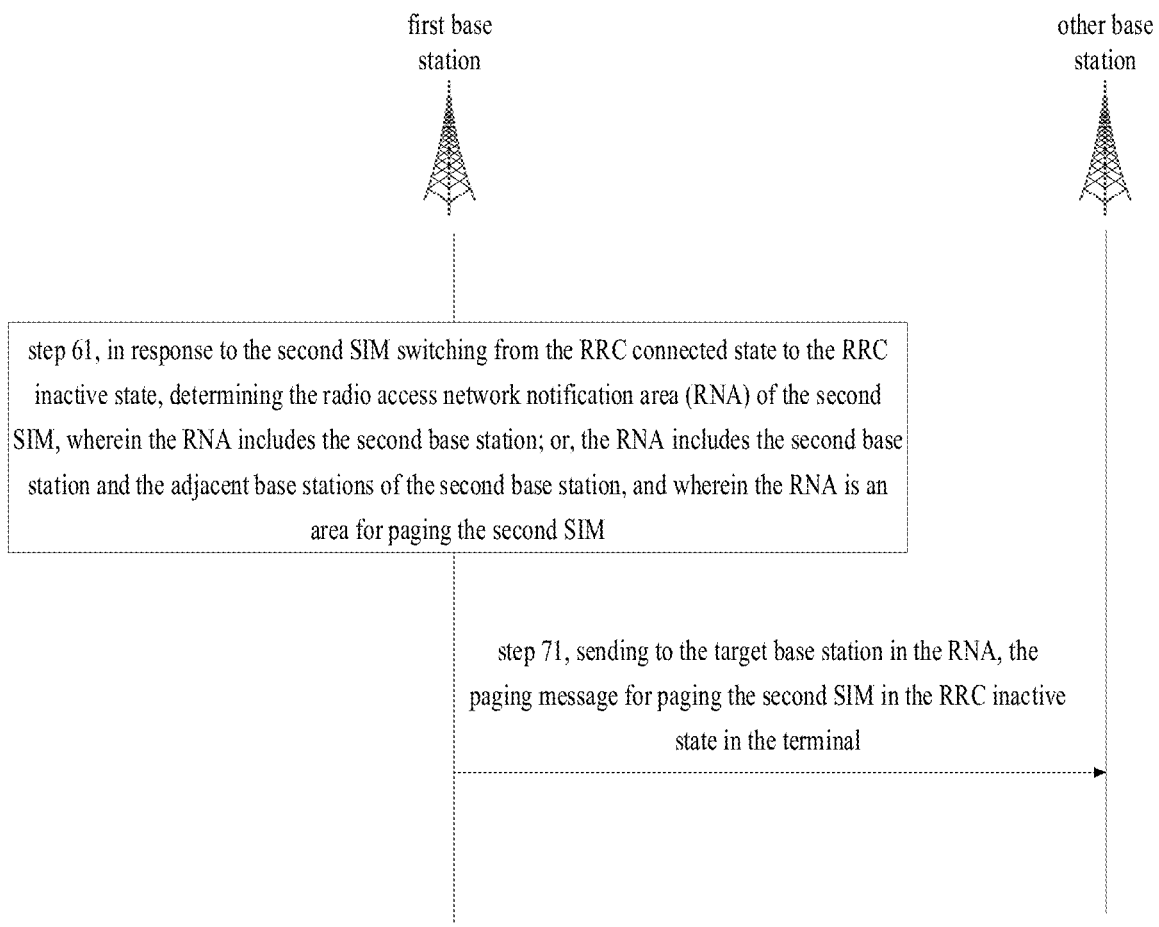
FIG. 7 is a flowchart of a method for sending a paging message according to an example of the present disclosure.

As shown in FIG. 7, this embodiment provides a method for sending a paging message. In step 31, sending to the target base station, the paging message for paging the second SIM in the RRC inactive state in the terminal, includes:
  step 71, sending to the target base station in the RNA, the paging message for paging the second SIM in the RRC inactive state in the terminal.

In one embodiment, the RNA includes base station 2, base station 3, base station 4, base station 5, base station 6, and base station 7. The first base station is base station 1, and the second base station is base station 2. The target base station can include base station 2, base station 3, and base station 7.

In this way, the first base station can narrow the range of sending the paging message, and does not send the paging message to base stations other than base stations 2, 3, and 7.

In one embodiment, base station 2, base station 3, and base station 7 will send a paging message after receiving the paging message sent by base station 1, to page the second SIM in the RRC inactive state.

Figure 8:
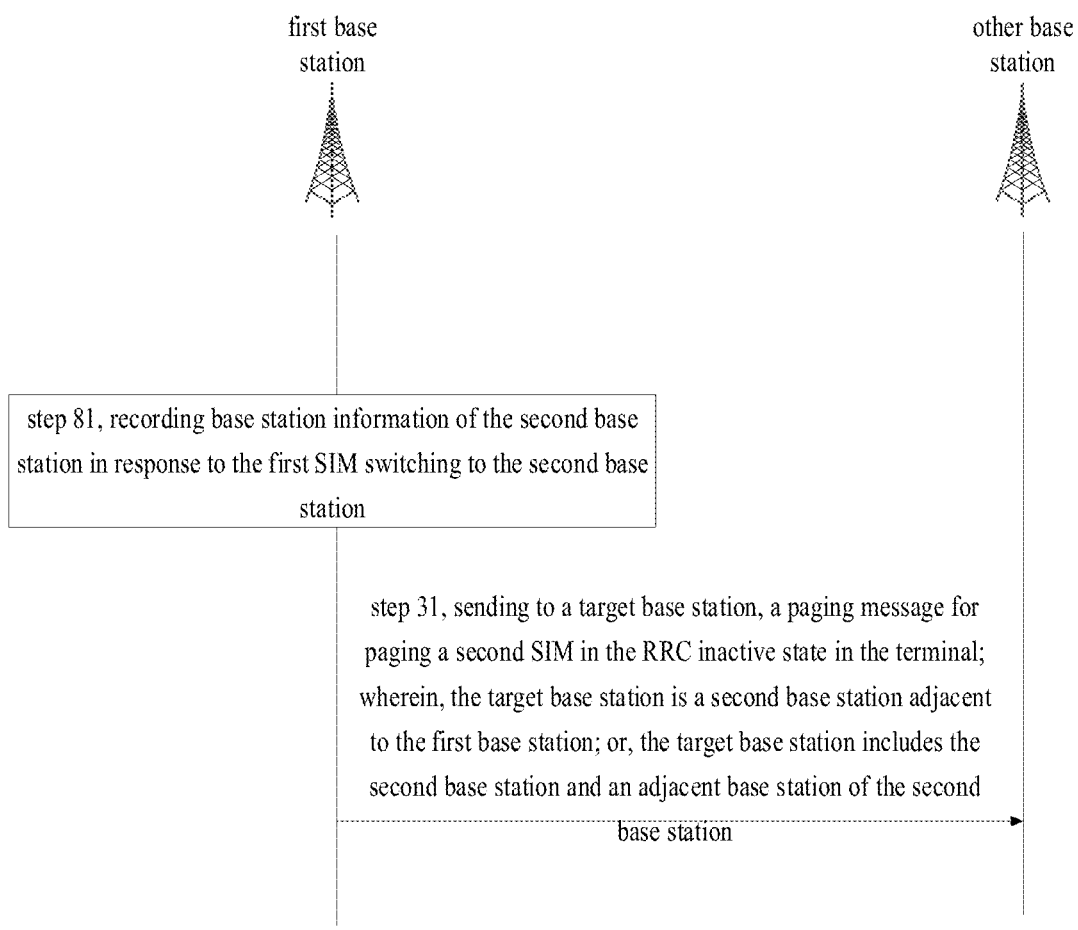
FIG. 8 is a flowchart of a method for sending a paging message according to an example of the present disclosure.

As shown in FIG. 8, this embodiment provides a method for sending a paging message, which further includes:
  step 81, recording base station information of the second base station in response to the first SIM switching to the second base station.

In one embodiment, in response to the first SIM switching to the second base station, the base station information of the second base station to which the first SIM switches is stored.

In one embodiment, the base station information may be any information that the terminal switches to the second base station. The first base station can determine the information of the base station to which the terminal switches by querying the base station information.

In one embodiment, the base station information may be identification information of the second base station or geographic location information of the second base station.

In step 31, sending to the target base station, the paging message for paging the second SIM in the RRC inactive state in the terminal, includes:
  step 82, sending the paging message to the target base station based don the base station information, for paging the second SIM in the RRC inactive state in the terminal.

In one embodiment, the first base station can determine that the base station to which the terminal switches is the second base station by querying the base station information.

After receiving the data sent by the AMF, the first base station can determine that the base station to which the terminal switches is the second base station by querying the base station information. The first base station will send the paging message to the second base station and the base stations adjacent to the second base station.

Figure 9:
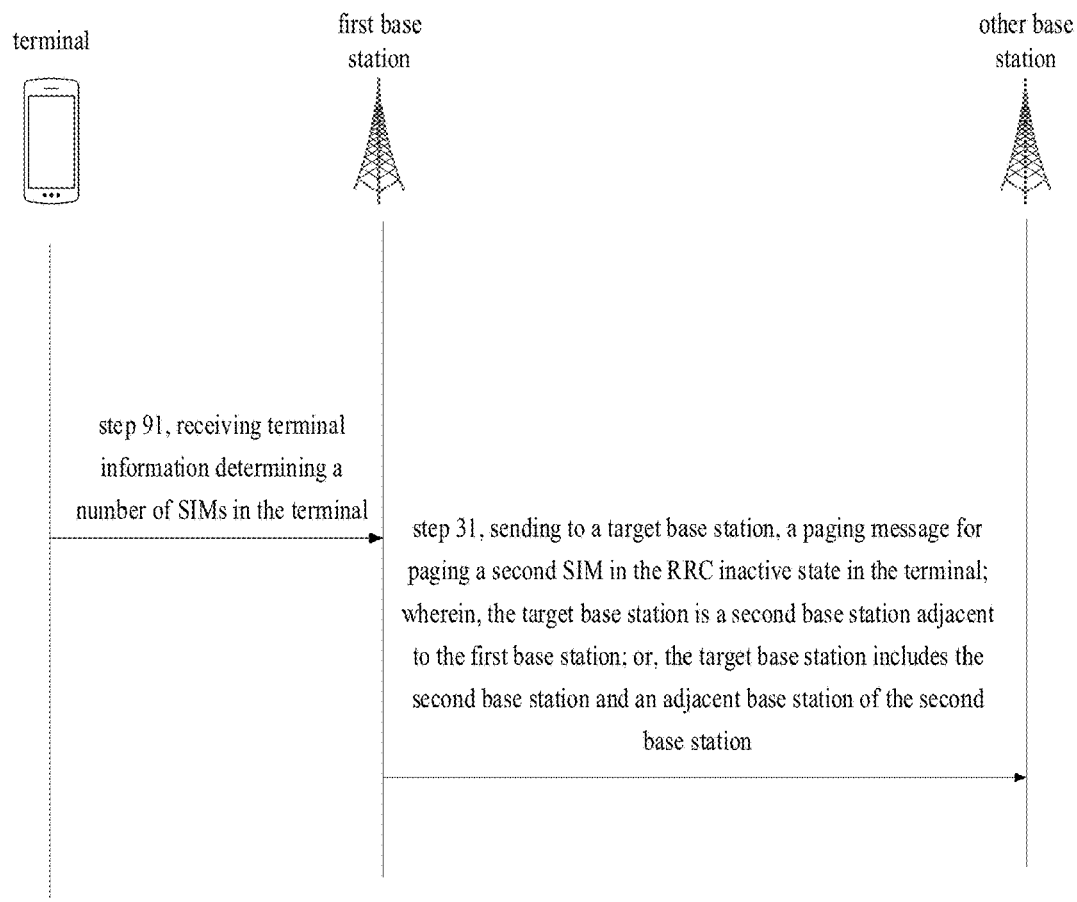
FIG. 9 is a flowchart of a method for sending a paging message according to an example of the present disclosure.

As shown in FIG. 9, this embodiment provides a method for sending a paging message, which further includes:

step 91, receiving terminal information determining a number of SIMs in the terminal.

In one embodiment, it may be that receiving identity document (ID) information of all SIMs included in the terminal sent by the terminal.

In one embodiment, the first base station determines the number of SIMs based on the number of IDs contained in the terminal information sent by the base station, so as to determine whether the terminal is a multi-SIM terminal. In one embodiment, one ID identifies one SIM. Therefore, the number of IDs is the number of SIMs in the terminal.

Please refer to Table 1. For example, if the terminal information contains two IDs of $ID_1$ and $ID_2$, the number of SIMs is 2; If the terminal information includes three IDs of $ID_1$, $ID_2$ and $ID_3$, the number of SIMs is 3.

TABLE 1

| terminal information | number of SIMs |
|---|---|
| $ID_1$: XXXX01 | 2 |
| $ID_2$: XXXX02 | |
| $ID_1$: XXXX01 | 3 |
| $ID_2$: XXXX02 | |
| $ID_3$: XXXX03 | |

In one embodiment, if one SIM contains one ID, the number of IDs is equal to the number of SIMs.

In one embodiment, when the number of SIMs is greater than 2, it is determined that the terminal is a multi-SIM terminal.

In one embodiment, after the terminal is determined to be a multi-SIM terminal, in response to the first SIM in the RRC connected state in the terminal switching to the second base station adjacent to the first base station, a paging message is sent to the target base station for paging the second SIM in the RRC inactive state in the terminal.

In one embodiment, before sending the paging message for paging the second SIM in the RRC inactive state in the terminal to the target base station, the terminal information determining the number of SIMs in the terminal is received.

Figure 10:
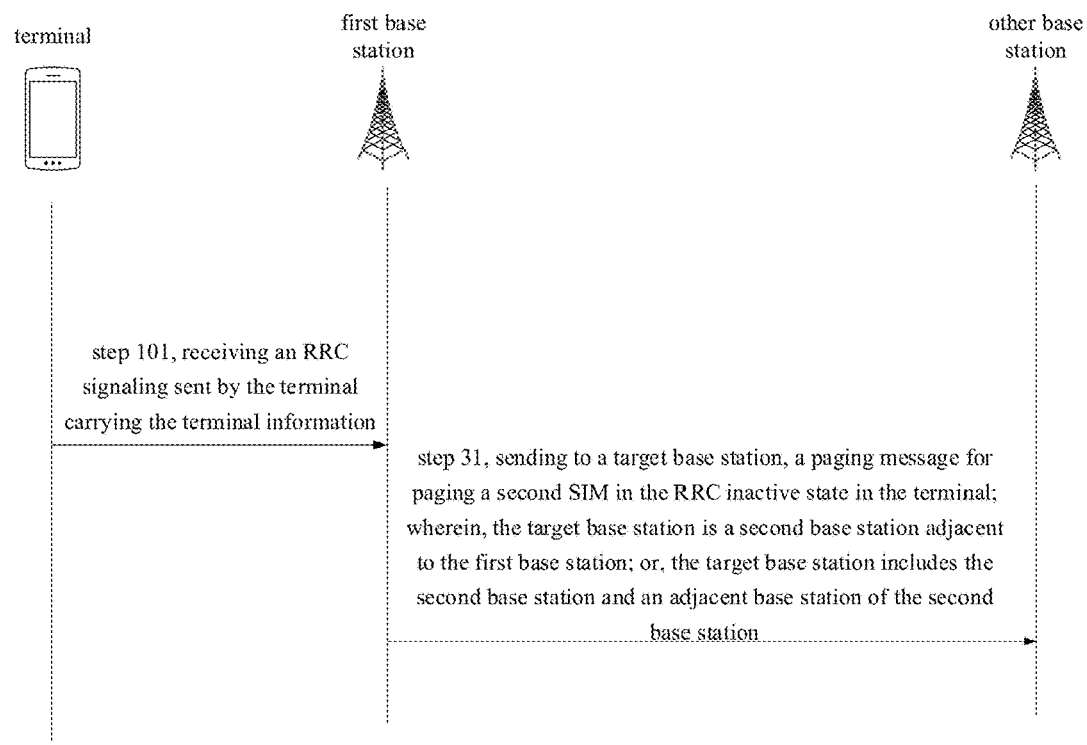
FIG. 10 is a flowchart of a method for sending a paging message according to an example of the present disclosure.

As shown in FIG. 10, this embodiment provides a method for sending a paging message. In step 91, receiving the terminal information determining the number of SIMs in the terminal, includes:

step 101, receiving an RRC signaling sent by the terminal carrying the terminal information.

In one embodiment, the RRC signaling is terminal assistance information (UEAssistanceInformation). In an application scenario, UEAssistanceInformation carrying the terminal information sent by the terminal is received.

Thus, in this embodiment, the existing RRC signaling can be used to carry the terminal information, realizing the multiplexing of RRC signaling, and improving the signaling compatibility.

Figure 11:
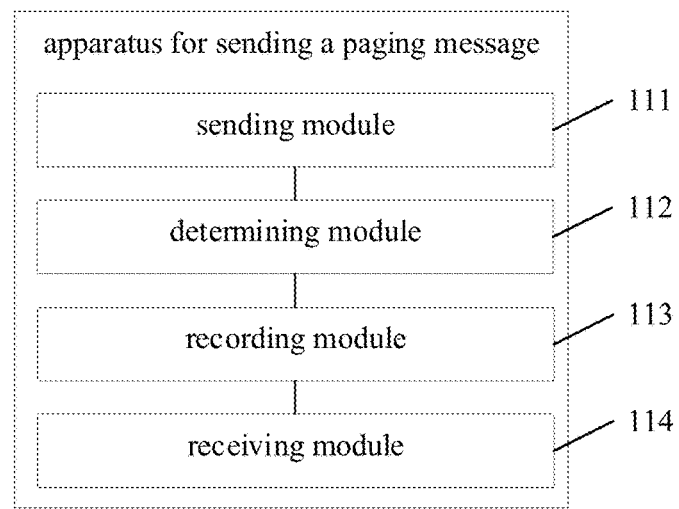
FIG. 11 is a block diagram of an apparatus for sending a paging message according to an example of the present disclosure.

As shown in FIG. 11, embodiments of the present disclosure provide an apparatus for sending a paging message. The apparatus is applied to the first base station connected with the first SIM in the terminal, and the apparatus includes a sending module 111.

The sending module 111 is configured to send to a target base station, a paging message for paging a second SIM in a radio resource control (RRC) inactive state in the terminal, wherein the target base station is a second base station adjacent to the first base station; or, the target base station is the second base station and an adjacent base station of the second base station.

In an embodiment, the sending module 111 is further configured to: send to the target base station, the paging message for paging the second SIM in the RRC inactive state in the terminal, in response to the first SIM in an RRC connected state of the terminal switching from the first base station to the second base station.

In an embodiment, the apparatus further includes a determining module 112. The determining module is configured to determine a radio access network notification area (RNA) of the second SIM in response to the second SIM switching from the RRC connected state to the RRC inactive state, wherein, the RNA comprises the second base station; or, the RNA comprises the second base station and the adjacent base station of the second base station, and wherein, the RNA is an area for paging the second SIM.

In an embodiment, the sending module 111 is further configured to: send to the target base station in the RNA, the paging message for paging the second SIM in the RRC inactive state in the terminal.

In an embodiment, the apparatus further includes a recording module 113. The recording module is configured to record base station information of the second base station in response to the first SIM switching to the second base station;

the sending module 111 is further configured to:
send the paging message to the target base station based on the base station information, for paging the second SIM in the RRC inactive state in the terminal.

In an embodiment, the apparatus further includes a receiving module 114. The receiving module is configured to receive terminal information for determining a number of SIMs in the terminal.

In an embodiment, the receiving module 114 is further configured to: receive an RRC signaling sent by the terminal carrying the terminal information.

As for the apparatus in the above embodiments, the specific mode of each module to perform operation has been described in detail in embodiments of the method, and will not be described in detail here.

Embodiments of the present disclosure provide a communication device, which includes:
a processor;
a memory for storing instructions executable by the processor;
wherein, the processor is configured to implement the method applied to any embodiment of the present disclosure when running the executable instructions.

The memory may include various types of storage media, which are non-temporary computer storage media, and can continue to memorize and store information on the communication device after power down.

The processor may be connected with the memory through a bus or the like to read the executable programs stored on the memory.

Embodiments of the present disclosure also provide a computer storage medium, wherein the computer storage medium stores a computer executable program, and the method described in any embodiment of the present disclosure is implemented when the executable program is executed by a processor.

As for the device in the above embodiment, the specific mode of each module to perform operation has been described in detail in embodiments of the method, and will not be described in detail here.

Figure 12:
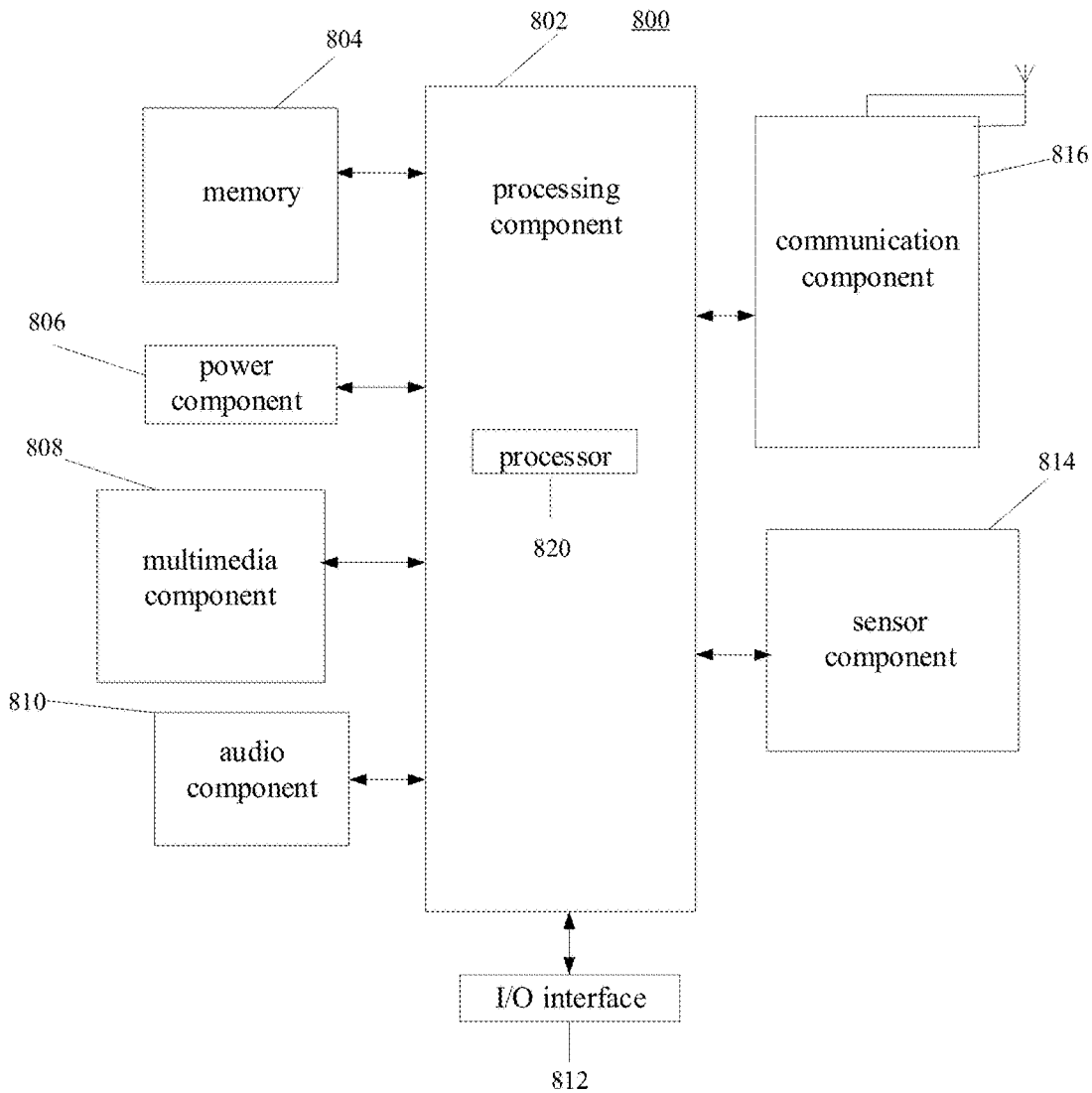
FIG. 12 is a block diagram of a user equipment according to an example of the present disclosure.

FIG. 12 is a block diagram of a user equipment (UE) 800 according to an example of the present disclosure. For example, the UE 800 may be a mobile phone, a computer, a digital broadcasting user device, a messaging device, a game console, a tablet device, a medical device, a fitness device, a personal digital assistant, and the like.

Referring to FIG. 12, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any disclosures or methods operated on the UE 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging disclosures. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as WiFi, 2G, or 3G, or a combination thereof. In one example of the present disclosure, the communication component 816 receives a broadcast signal or broadcast associated information from an external broadcast management system via a broadcast channel. In one example of the present disclosure, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example of the present disclosure, the UE 800 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an example of the present disclosure, there is also provided a non-transitory computer-readable storage medium including instructions, such as included in the memory 804, executable by the processor 820 in the UE 800, for performing the above-described methods. For example, the non-transitory computer-readable storage medium may be a ROM, a RAM, a CD-ROM, a magnetic tape, a floppy disc, an optical data storage device, and the like.

Figure 13:
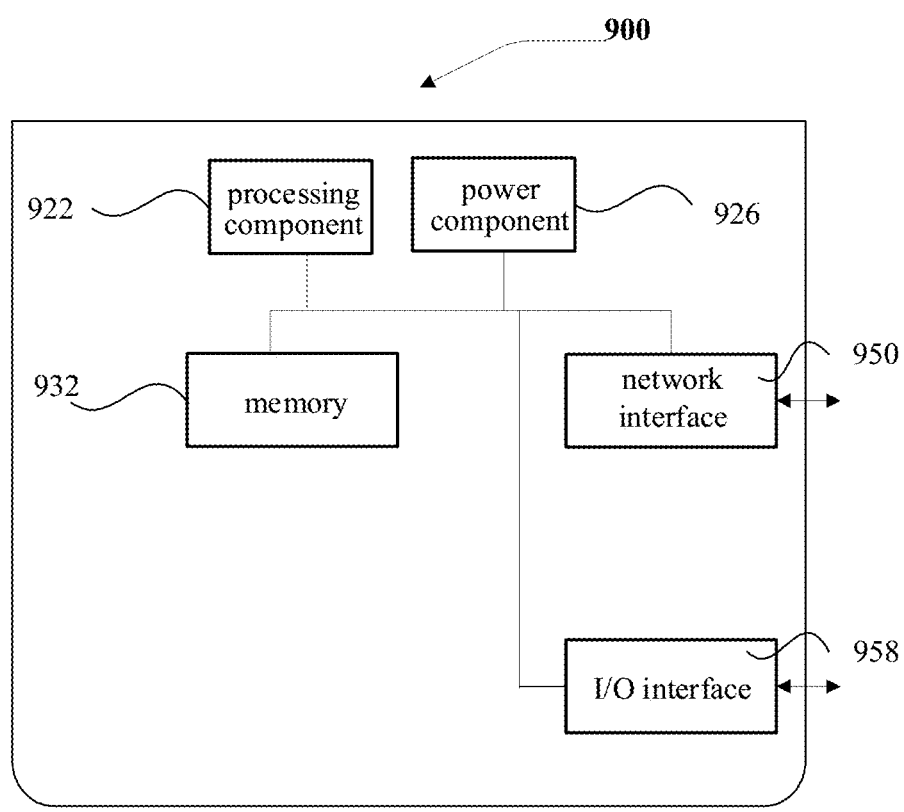
FIG. 13 is a block diagram of a base station according to an example of the present disclosure.

As shown in FIG. 13, an embodiment of the present disclosure shows a structure of a base station. For example, the base station 900 may be provided as a network side device. Referring to FIG. 13, the base station 900 includes a processing component 922, which further includes one or more processors, and a memory resource represented by a memory 932 for storing instructions, such as application programs, that can be executed by the processing component 922. Application programs stored in memory 932 may include one or more modules each corresponding to a set of instructions. In addition, the processing component 922 is configured to execute instructions to implement any of the aforementioned methods applied to the base station as described above, for example, as shown in FIGS. 2-6.

The base station 900 may also include a power component 926 configured to perform power management of the base station 900, a wired or wireless network interface 950 configured to connect the base station 900 to the network, and an input/output (I/O) interface 958. The base station 900 can operate an operating system based on the memory 932, such as Windows Server™, Mac OS X™, Unix™, Linux™, FreeBSD™, or similar.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only.

In embodiments of the present disclosure, a paging message is sent to the target base station for paging the second SIM in the RRC inactive state in the terminal, wherein the target base station is the second base station adjacent to the first base station; or, the target base station includes the second base station and the adjacent base station of the second base station. Here, the first base station only needs to send the paging message for paging the second SIM to the target base station, and then it can page to the second SIM, without the need to page other base stations except the target base station, which narrows the paging range and reduces the paging signaling cost.

It will be appreciated that the present disclosure is not limited to the exact construction that has been described above and illustrated in the accompanying drawings, and that various modifications and changes can be made without departing from the scope thereof.

What is claimed is:

1. A method for sending a paging message, comprising:
   determining, by a first base station, that a first subscriber identity module (SIM) in a terminal is in a radio resource control (RRC) connected state, and receiving, by the first base, data for a second SIM in an RRC inactive state sent by an access and mobility management function (AMF); and
   in response to the first SIM in the RRC connected state of the terminal switching from the first base station to a second base station, sending, by the first base station, a paging message for paging the second SIM in the RRC inactive state in the terminal to a target base station, wherein the terminal comprises the first SIM and the second SIM, wherein the target base station is the second base station adjacent to the first base station, or the target base station comprises the second base station and an adjacent base station of the second base station.

2. The method of claim 1, further comprising:
   determining a radio access network notification area (RNA) of the second SIM in response to the second SIM switching from the RRC connected state to the RRC inactive state, wherein the RNA comprises the second base station, or the RNA comprises the second base station and the adjacent base station of the second base station; and wherein the RNA is an area for paging the second SIM.

3. The method of claim 2, wherein sending to the target base station, the paging message for paging the second SIM in the RRC inactive state in the terminal, comprises:
   sending to the target base station in the RNA, the paging message for paging the second SIM in the RRC inactive state in the terminal.

4. The method of claim 1, further comprising:
   recording base station information of the second base station in response to the first SIM switching to the second base station;
   wherein, sending to the target base station, the paging message for paging the second SIM in the RRC inactive state in the terminal, comprises:
   sending the paging message to the target base station based on the base station information, for paging the second SIM in the RRC inactive state in the terminal.

5. The method of claim 1, further comprising:
   receiving terminal information for determining a number of SIMs in the terminal.

6. The method of claim 5, wherein receiving the terminal information for determining the number of SIMs in the terminal comprises: receiving an RRC signaling sent by the terminal carrying the terminal information.

7. A first base station, comprising:
   a processor; and a memory, configured to store instructions executable by the processor;
   wherein the processor is configured to:
   determine that a first subscriber identity module (SIM) is in a radio resource control RRC) connected state, and receive data for a second SIM in an RRC inactive state sent by an access and mobility management function (AMF), wherein the terminal comprises the first SIM and the second SIM; and
   in response to the first SIM in the RRC connected state of a terminal switching from the first base station to a second base station, send, by the first base station, a paging message for paging the second SIM in the RRC inactive state in the terminal to a target base station, wherein the terminal comprises the first SIM and the second SIM, wherein the target base station is the second base station adjacent to the first base station, or the target base station comprises the second base station and an adjacent base station of the second base station.

8. The first base station of claim 7, wherein the processor is further configured to:
   determine a radio access network notification area (RNA) of the second SIM in response to the second SIM switching from the RRC connected state to the RRC inactive state, wherein, the RNA comprises the second base station; or, the RNA comprises the second base station and the adjacent base station of the second base station, and wherein, the RNA is an area for paging the second SIM.

9. The first base station of claim 8, wherein the processor is configured to:
   send to the target base station in the RNA, the paging message for paging the second SIM in the RRC inactive state in the terminal.

10. The first base station of claim 7, wherein the processor is further configured to:
    receive terminal information for determining a number of SIMs in the terminal.

11. The first base station of claim 10, wherein the processor is configured to:
receive an RRC signaling sent by the terminal carrying the terminal information.

12. A non-transitory computer storage medium stored thereon with computer executable instructions, which implements a method for sending a paging message when being executed by a processor in a first base station, the method comprising:
determining that a first subscriber identity module (SIM) in a terminal is in a radio resource control (RRC) connected state, and receiving data for a second SIM in an RRC inactive state sent by an access and mobility management function (AMF); and
in response to the first SIM in the RRC connected state of the terminal switching from the first base station to a second base station, sending a paging message for paging the second SIM in the RRC inactive state in the terminal to a target base station, wherein the terminal comprises the first SIM and the second SIM, the target base station is the second base station adjacent to the first base station; or, the target base station comprises the second base station and an adjacent base station of the second base station.

13. The first base station of claim 12, wherein the processor is further configured to:
record base station information of the second base station in response to the first SIM switching to the second base station;
wherein, the processor is configured to:
send the paging message to the target base station based on the base station information, for paging the second SIM in the RRC inactive state in the terminal.

14. The non-transitory computer storage medium of claim 12, wherein sending to the target base station, the paging message for paging the second SIM in the RRC inactive state in the terminal, comprises:
sending to the target base station, the paging message for paging the second SIM in the RRC inactive state in the terminal, in response to the first SIM in an RRC connected state of the terminal switching from the first base station to the second base station.

15. The non-transitory computer storage medium of claim 12, wherein the method further comprises:
determining a radio access network notification area (RNA) of the second SIM in response to the second SIM switching from the RRC connected state to the RRC inactive state, wherein, the RNA comprises the second base station; or, the RNA comprises the second base station and the adjacent base station of the second base station, and wherein, the RNA is an area for paging the second SIM.

16. The non-transitory computer storage medium of claim 15, wherein sending to the target base station, the paging message for paging the second SIM in the RRC inactive state in the terminal, comprises:
sending to the target base station in the RNA, the paging message for paging the second SIM in the RRC inactive state in the terminal.

17. The non-transitory computer storage medium of claim 14, wherein the method further comprises:
recording base station information of the second base station in response to the first SIM switching to the second base station;
wherein, sending to the target base station, the paging message for paging the second SIM in the RRC inactive state in the terminal, comprises:
sending the paging message to the target base station based on the base station information, for paging the second SIM in the RRC inactive state in the terminal.

18. The non-transitory computer storage medium of claim 12, wherein the method further comprises:
receiving terminal information for determining a number of SIMs in the terminal.

* * * * *